May 17, 1960     K. G. CAEN     2,936,781

FUEL PRESSURE REGULATORS

Filed July 11, 1956

*INVENTOR.*
KENNETH G. CAEN
BY

ATTORNEY

United States Patent Office 2,936,781
Patented May 17, 1960

2,936,781

FUEL PRESSURE REGULATORS

Kenneth G. Caen, St. Louis, Mo., assignor to Laurance J. Horan, University City, Mo.

Application July 11, 1956, Serial No. 597,126

2 Claims. (Cl. 137—588)

This invention relates in general to pressure regulators and, more particularly, to a pressure regulator for effecting the delivery of fuel at a predetermined pressure to the carburetor of internal combustion engines.

Heretofore, fuel pressure regulators for internal combustion engines have been of the diaphragm type, that is, wherein the pressure sensitive member has consisted of a flexible diaphragm, upon the "bulging" of which under excess fuel pressure, the regulator has been adapted to close, causing a temporary discontinuance of fluid flow therethrough until the desired pressure has been re-established. However, regulators of this type have not operated with the accuracy and sensitivity requisite for consistent economical and efficient fuel consumption. In such diaphragm regulators the fuel pressure operates against the air pressure on the opposite side of the diaphragm. The air pressure will vary as a result of numerous factors, such as the speed of rotation of the fan, the rate and character of the motion of the vehicle, the particular barometric pressure, and the atmospheric temperature, so that no definite and exact setting can be achieved. Furthermore, a rapid oscillation will develop in the diaphragm if any specific setting is attempted because of the short cycle. Associated with the diaphragm are numerous customarily attendant mechanical elements, as levers, cams, etc., which are subject to breakdown, necessitating frequent repair, and hence, not rendering the regulator reliable in use. It may also be pointed out that diaphragm regulators have provided for only the two usual connections, namely, to the carburetor and the pressure side of the fuel pump, so that when the predetermined operating pressure is exceeded, flow through the regulators is arrested, there being no relief flow.

Therefore, it is a primary object of the present invention to provide a fuel pressure regulator incorporating a pressure responsive member which may be accurately and sensitively set and which is not influenced by air pressure, whereby consistent operation will be obtained at all times.

It is another object of the present invention to provide a fuel pressure regulator incorporating a passage for return flow of fuel to the suction side of the fuel pump when the predetermined operating pressure of the regulator is exceeded.

It is an additional object of the present invention to provide a fuel pressure regulator which has a simplicity of parts; which may be readily disassembled and reassembled for cleaning, adjusting and other purposes; which is not subject to breakdown, and is hence, reliable in operation and which may be economically manufactured of durable components.

These and other detailed objects are obtained by the structures shown in the accompanying drawing, in which—

Figure 1:
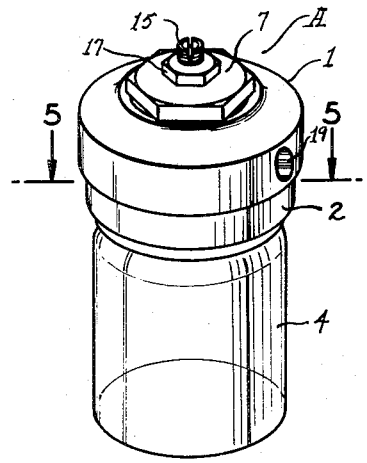
Figure 1 is a perspective view of a fuel pressure regulator constructed in accordance with and embodying the present invention.
Figure 2:
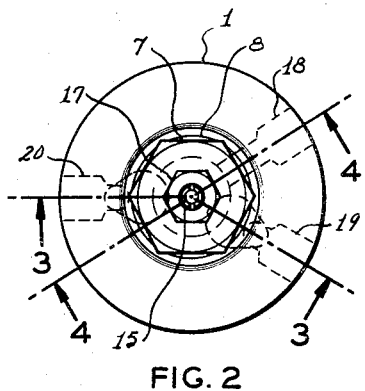
Figure 2 is a top plan view.
Figure 3:
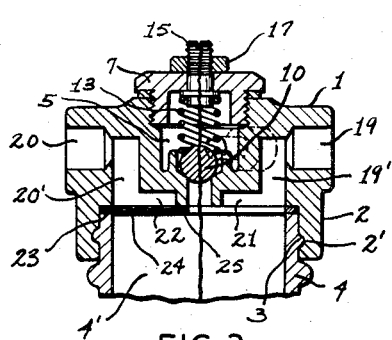
Figure 3 is a vertical transverse section taken on the line 3—3 of Figure 2.
Figure 4:
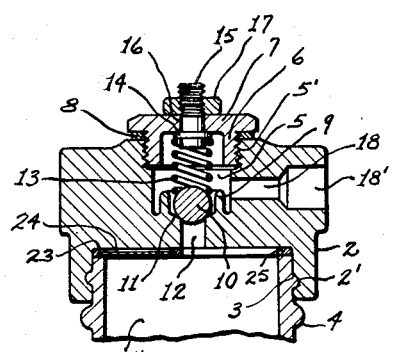
Figure 4 is a vertical transverse section taken on the line 4—4 of Figure 2.
Figure 5:
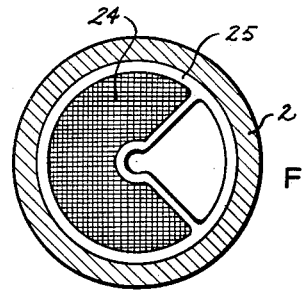
Figure 5 is a horizontal transverse section taken on the line 5—5 of Figure 1.

Referring now by reference characters to the drawing which illustrates the preferred embodiment of the present invention, A generally designates a fuel pressure regulator of generally cylindrical form for disposition between the fuel pump and carburetor of an internal combustion engine. Regulator A comprises an annular cap or upper member, having a body portion 1, preferably of metal, and a depending skirt 2 internally threaded, as at 2', for tight, detachable engagement upon the externally threaded neck 3 of a lower receptacle-forming member 4, desirably of glass or other transparent material, which interially constitutes a pressure compartment 4'. Cap body 1 is centrally provided with an upwardly opening chamber 5, the upper side wall portion of which is threaded, as at 5', for receiving the neck 6 of a closure 7; there being a gasket 8 interposed between the upper surface of cap body 1 and the under surface of closure 7 to render the union fluid-proof. Centrally of the lower portion of chamber 5 is an upstanding, annular retainer 9 for a ball valve 10 normally resting upon a valve seat 11 within retainer 9. Opening within valve seat 11 is the upper end of a downwardly extending passage 12 through which communication is established between chamber 5 and pressure compartment 4'. Ball valve 10 is urged into closed relationship with respect to the upper end of passage 12 by means of a coil spring 13 bearing at its lower end against the upper surface of ball valve 10 and at its other or upper end against a collar 14 fixed on the lower end of an adjusting screw 15, which extends through an opening 16 in closure 7 into chamber 5 and is threadedly engaged in its outwardly projecting portion to a nut 17. It will thus be seen that the downwardly directed force, as applied by coil spring 13, upon ball valve 10 for biasing same into valve closed condition may be easily regulated by the indicated inwardly or outwardly threading of adjusting screw 15 for purposes more apparent hereinafter.

Extending radially from chamber 5 to the exterior side surface of cap body 1 is a relief passage 18 which in its outer portion is diametrally increased, as at 18', and may be internally threaded, for facilitating engagement, in any convenient manner, with a fitting or coupling (not shown) for connection by a conduit member (not shown) to the fuel line adjacent the intake or suction side of the fuel pump (not shown) of the internal combustion engine in which regulator A is installed.

Also formed in the body 1 of the cap are spaced apart fuel inlet and fuel outlet passages 19, 20 respectively; said passages being located radially outwardly of chamber 5. Fuel inlet passage 19 is adapted for connection, as by a hose section or the like (not shown), to the outlet or pressure side of the fuel pump, while fuel outlet passage 20 is designed for connection with the intake side of the carburetor. It should be recognized that the relative locations of passages 18, 19, and 20 are essentially determined by convenience, so that connection with the related parts of the internal combustion engine can be most easily accomplished. Hence, the particular engine involved will dictate the passage arrangement of cap 1, although the particular relationship shown herein has been found to render regulator A of general universal adaptability.

Fuel inlet and outlet passages 19, 20, respectively, are each provided with an inner, downwardly extending portion 19', 20', respectively, which at their lower ends open into downwardly opening recesses 21, 22, respectively, for completing the fluid flow-path with pressure chamber 4'. Disposed upon the upper edge surface of receptacle 4 and clampingly maintained thereon by an internal shoulder 23 formed on the under surface of cap body 1 is a relatively fine, mesh screen 24, having a sturdy binding edge 25, and which is of such extent as to be disposed coveringly beneath recess 22 of fuel outlet passage 20 so that any fluid being delivered thereto will be strained of foreign particles such as dirt, grit, and like injurious impurities; it being noted thereby that said screen 24 does not extend across the lower end of passage 12 or recess 21 of fuel inlet passage 19.

In usage, regulator A is properly connected to the fuel pump and carburetor in the manner above described. Fuel from the fuel pump will pass into passage 19, thence into pressure compartment 4', and therefrom flow through screen 24 and outwardly through fuel outlet pipe 20 to the carburetor. Customarily, the fuel supply from the pump will be at a pressure of about four to five pounds per square inch. This pressure exceeds that at which a float chamber type carburetor may maintain maximum operating efficiency wherein fuel should preferably be delivered at a constant, relatively low pressure, regardless of the rate at which the fuel is being used by the carburetor. Consequently, it is desirable that regulator A be set at about three and one half pounds, that is, being designed to cause the opening of ball valve should the pressure of the fuel within pressure chamber 4' exceed that amount. Thus, adjusting screw 15 is set so as to apply the requisite pressure upon ball valve 10 whereby the same will remain seated as long as the fuel pressure in compartment 4' does not exceed three and one half pounds. Should the fuel pressure exceed that amount, the pressure of coil spring 13 will be overcome and ball valve 10 shifted upwardly from valve seat 11, permitting fuel to flow into chamber 5 and thence outwardly through relief passage 18 for return to the suction side of the fuel pump. Hence, fuel flow to the carburetor will be substantially arrested or slowed until the pressure in the compartment 4' has been lowered so as to cause closing of ball valve 10 with consequent resumption of fuel flow to the carburetor. It will be seen that ball valve 10 can be set to effect valve opening at any predetermined pressure by the mere indicated manipulation of adjusting screw 15. Ball valve 10 can be set to open at a definite, precisely predetermined pressure, since the force applied thereon by the coil spring will be constant. Thus, accuracy and sensitivity can be accomplished with the present invention which could not be obtained with diaphragm type regulators so widely used heretofore, since the counter pressure upon the diaphragm could not, perforce, remain constant.

Regulator A comprises a marked simplicity of parts which are not subject to ready breakdown so that the same will operate effectively and reliably without frequent repair and the component parts may be economically manufactured.

It should be understood that changes and modifications in the formation, construction, arrangement, and combination of the several parts of the fuel pressure regulator may be made and substituted for these herein shown and described without departing from the nature and principle of my invention.

Having thus described my invention, what I claim and desire to secure by letters patent is:

1. A liquid fuel pressure regulator comprising a cast cylindrical body having a centrally disposed, upwardly opening compartment, a removable closure cap for the upper end of said compartment, a valve seat provided in the lower end of said compartment, conduit means extending through said valve seat and the lower face of said body, a ball valve disposed on said valve seat, a spring interposed between said ball valve and the inner face of said closure cap for biasing said ball valve into seated condition, said body further having a radial fuel return passage extending from said compartment to the outer side face of said body, said radial passage being diametrally enlarged in its outer portion, said body further having radially outwardly spaced of said compartment a fuel inlet passage and a fuel outlet passage, each passage having a first section extending from the outer side face of said body radially with respect to said compartment and a second section extending downwardly from the inner end of said first section in axially parallel relation to said conduit means and opening through the lower face of said body, said first sections of said fuel outlet and fuel inlet passages being diametrally increased in their outer portions, the longitudinal axes of said radial passage and said first sections of said fuel outlet and inlet passages being co-planar, the major axis of said compartment and said second sections of said fuel outlet and inlet passages being parallel, and a transparent fuel-receiving member detachably engaged upon the lower end of said body and being in communication through its upper, top end with said radial passage through said conduit means and said second sections of each of said fuel outlet and fuel inlet passages.

2. A liquid fuel pressure regulator for use with internal combustion engines having a fuel pump and a carburetor comprising a cast metallic cylindrically-formed body having a centrally disposed upwardly opening compartment, a removable closure cap threadedly engaged on the upper end of said compartment, a valve seat provided in the lower end of said compartment, said valve seat being connected to the outer side of the lower face of said body by a conduit, a ball valve disposed upon said valve seat, a coil spring interposed between said ball valve and the inner face of said closure cap for biasing said ball valve into seated condition, an adjusting screw extending through an opening in said closure cap for bearing engagement at its inner end with said coil spring for adjusting the force of said spring against said ball valve, a transparent open-top, fuel receptacle engaged at its upper end with said body for disposition therebelow, said body having a radial passage extending from said compartment to the outer face of said body, said radial passage being diametrally enlarged in its outer portion, said body further having radially outwardly spaced of said compartment a fuel inlet passage and a fuel outlet passage, each of said fuel inlet and outlet passages having a first section extending from the outer side face of said body radially toward said compartment, and a second section extending downwardly from the inner end of said first section in axial parallel relation to said conduit and through the lower face of said body for communication with said fuel receptacle through its upper, top end, said conduit opening at its lower end into said fuel receptacle whereby said ball valve will be subject to pressure of fuel in the receptacle.

References Cited in the file of this patent

UNITED STATES PATENTS

| | | |
|---|---|---|
| 461,235 | Butler | Oct. 13, 1891 |
| 1,115,157 | Baldwin | Oct. 27, 1914 |
| 2,031,873 | Williams | Feb. 25, 1936 |
| 2,044,277 | Bukolt | June 16, 1936 |
| 2,137,526 | Collins | Nov. 22, 1938 |
| 2,214,083 | Lester | Sept. 10, 1940 |
| 2,521,270 | Vanni | Sept. 5, 1950 |
| 2,657,635 | Thoren | Nov. 3, 1953 |

FOREIGN PATENTS

| | | |
|---|---|---|
| 145,366 | Australia | Feb. 25, 1952 |